UNIDIRECTIONAL TRIGGERING SYSTEM FOR HIGHWAY COMMUNICATIONS

Filed June 13, 1960

INVENTOR.
Eugene A. Hanysz
BY
Paul J. Ethington
ATTORNEY

United States Patent Office 3,105,120
Patented Sept. 24, 1963

3,105,120
UNIDIRECTIONAL TRIGGERING SYSTEM FOR HIGHWAY COMMUNICATIONS

Eugene A. Hanysz, Royal Oak, Mich., assignor to General Motors Corporation, Detroit, Mich., a corporation of Delaware Filed June 13, 1960, Ser. No. 35,711
4 Claims. (Cl. 179—82)

This invention relates to a system for transmitting messages to moving vehicles and more particularly to a unidirectional triggering system for use in roadway communications apparatus.

Instead of relying upon conventional road signs, it would be helpful if audio messages could be transmitted to vehicles moving past a given point on a highway so that the drivers of such vehicles could be informed of various road or traffic conditions without removing their eyes from the road in order to read the signs. Such transmission may be effected by employing a radio transmitter adjacent a givenpoint on the highway and then utilizing vehicle-mounted receivers that are responsive to signals from this transmitter. In such a system it is preferable to use low frequency inductive coupling rather than high frequency radio transmission since the former can be of very short range and will not interfere with other radio services. Further, low frequency transmitting apparatus is much less costly and more reliable than high frequency or microwave transmission devices.

A low frequency system, however, is not highly directional and so the transmitted signal cannot be confined to specific lanes of the highway. Thus, if a signal is transmitted with sufficient power to be easily detected by passing vehicles in one lane, then this signal may likely be detected by vehicle-mounted receivers in vehicles traveling in other lanes of the highway since the signal does not drop off sharply over such moderate distances. However, it would be desirable for vehicle-mounted receivers to be responsive only if the vehicle is in a specific lane of the highway or traveling in one direction. That is, it might be desirable to transmit a message such as "Woodward Avenue Exit—One-Half Mile—Keep Right" to westbound vehicles on an expressway while this message would be meaningless and confusing to eastbound vehicles. Therefore, it is necessary to utilize a message transmission system wherein the vehicle-mounted receivers are normally unresponsive to the message signals but may be energized if the proper triggering signal is received at the proper time. Unidirectional roadway communication systems of this type are disclosed and claimed in the co-pending applications S.N. 6,055, filed February 1, 1960, and S.N. 20,746, filed April 8, 1960, both assigned to the assignee of the present invention.

It is the principal object of this invention to provide an improved unidirectional roadway communications system. It is another object to provide a unidirectional message transmission system wherein no separate trigger transmitter is utilized. A further object is to provide a unidirectional triggering system wherein a high-level message signal is used for triggering.

In accordance with this invention, transmitting apparatus is positioned adjacent a highway to transmit a message signal over an extended portion of the highway so that a vehicle traveling through this portion will receive the entire message. A trigger signal is established over a portion of the highway through which the vehicles pass prior to entering the area of the message signal. This trigger signal consists of a high-level message signal and may be produced by providing additional turns adjacent one end of the message signal transmitting antenna. Vehicle-mounted receivers are provided that are adapted to remain unresponsive to the low-level message signal until after a high-level message signal or trigger signal or trigger signal has been received. Thus, if a vehicle passes the high-level region first, the vehicle-mounted receiver will be energized and the low-level message signal will be received. Vehicles traveling in the opposite direction, however, will leave the area wherein the message signal may be received immediately after being energized by the trigger signal and so they will not be responsive to the message.

The novel features which are believed to be characteristic of the invention are set forth with particularity in the appended claims. The invention itself may best be understood by reference to the following description of one embodiment thereof, taken in conjunction with the accompanying drawing, in which:

Figure 1:
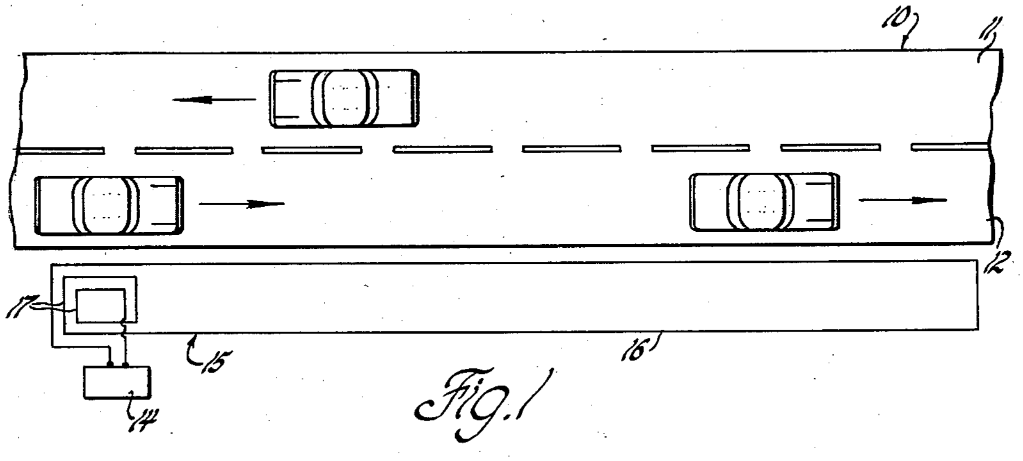
FIGURE 1 is a plan view of a roadway communication system installation incorporating the principal features of the invention.

Referring now to the drawing, and more particularly to FIGURE 1, there is shown a portion of a highway 10 having one lane 11 for vehicles traveling in one direction and a second lane 12 for vehicles traveling in the opposite direction as indicated by the arrows. Adjacent a portion of the highway 10 there is positioned a transmitter 14 which is adapted to provide a message signal in the form of a very-low-frequency carrier modulated with the desired information. The carrier frequency may be on the order of 10 to 14 kilocycles and each installation along the roadway would have the same carrier frequency so that the receiver tuning is fixed. The transmitter 14 may be modulated by audio signals derived from a microphone or a continuous magnetic tape reproducing device in conventional manner. Connected to the output of the transmitter 14 is a loop antenna array 15 including a message transmitting loop 16 and a trigger transmitting loop 17. The antenna 15 comprises wires which may be laid out horizontally on the surface adjacent the highway or may be buried in the ground for permanent installations. The loop 16 consists of a single turn 5 to 10 feet wide and 500 to 1000 feet long. The length would depend upon the length of the messages to be transmitted and upon the average traffic speed. The trigger transmitting loop 17 is shown comprising two extra turns of the same wire which was used for the loop 16. The loop 17 is effective to establish a high-level signal across the roadway due to the fact that additional turns are used.

Figure 2:
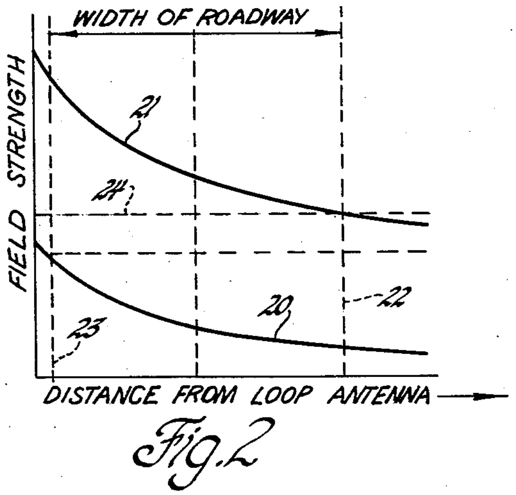
FIGURE 2 is a graphic representation of the field strength characteristics of the system of FIGURE 1.

The magnetic field strength produced by the antenna array 15 is shown in a graphic representation in FIGURE 2. A graph 20 represents the field strength produced by the message transmitting loop 16 as a function of the lateral distance across the highway from the loop antenna, such as might be measured at a point near the center of the loop 16. Also in FIGURE 2, a graph 21 is shown representing the magnetic field produced by the trigger transmitting loop 17 as a function of distance across the highway such as might be measured immediately adjacent the loop 17. It is seen that in the area between a line 22 which represents the outside edge of the lane 11 and a line 23 which represents the outside edge of the lane 12, the field strength produced by the loop 17 is at all points greater than that produced by the loop 16. Thus a level of magnetic field strength such as that represented by a line 24 in FIGURE 2 may be established as a triggering level. The vehicle-mounted receivers may then be adapted to be responsive only after receiving a signal exceeding this triggering level. It has been determined that the magnetic field strength adjacent a loop antenna excited by a low frequency signal does not vary to any appreciable extent due to weather or pavement conditions. In any event, there is a considerable margin of safety between the triggering level or line 24 and the highest portions of the graph 20.

Figure 3:
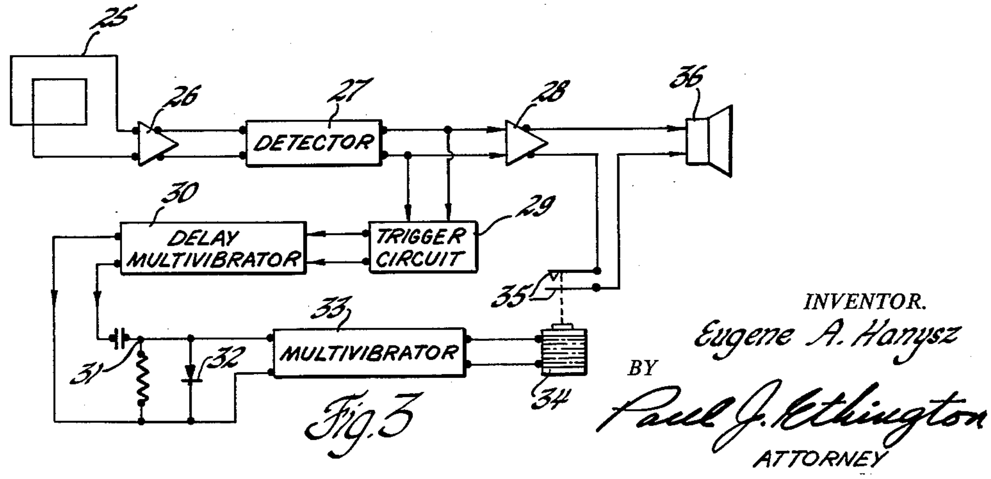
FIGURE 3 is a block diagram of a vehicle-mounted receiver which is utilized in conjunction with the system of FIGURE 1.

With reference to FIGURE 3, there is shown in block diagram form a receiver which is adapted to be responsive to the message transmission system of FIGURE 1. An antenna 25, preferably a ferrite rod device responsive to the low-frequency inductive coupling that is employed, is connected to the input of an amplifier 26 and the output of this amplifier is applied to a suitable detector 27. This detector may be a conventional rectifier and filter arrangement for demodulating an amplitude modulated signal. The detected output is applied to the input of a power amplifier 28 and is also applied at the same time to the input of a trigger circuit 29. The trigger circuit 29 is adapted to produce an output signal only when its input exceeds a predetermined triggering level. This level may correspond to the triggering level as shown by the line 24 in FIGURE 2. The trigger circuit 29 may be merely an amplifier stage which is biased below cut off by an amount equal to the detector output voltage produced by a magnetic field strength of a level greater than represented by the line 24.

The output of the trigger circuit 29 is connected to a delay multivibrator 30 which, when energized, is effective to produce an output pulse having a selected time duration. This time duration is the time necessary for a vehicle to travel through the area wherein the triggering signal may be received. The delay circuit may consist of a conventional one-shot multivibrator wherein the magnitudes of the components in the cross-coupling circuits are selected to produce the desired time duration of the output pulse, which is on the order of a fraction of a second. The output of the multivibrator 30 is applied to an RC differentiating circuit 31 and positive-going excursions of the output of this differentiating circuit are removed by a diode 32. Thus, a negative-going spike representing the trailing edge of the output pulse produced by the multivibrator 30 is applied to the input of a second multivibrator 33. The multivibrator 33 is likewise a conventional one-shot multivibrator and is effective to produce an output pulse having a time duration equal to the time necessary for a vehicle to traverse the entire length of the message signal transmitting loop 16. This output pulse is applied to the coil of a relay 34 such that this relay is energized as long as the output pulse is present. The relay 34 is adapted to operate a pair of normally open contacts 35 which are in circuit between the output of the power amplifier 28 and the input of a speaker 36. The speaker 36 is effective to reproduce the audio signals which were used to modulate the transmitter 14 only when the contacts 35 are closed.

In operation of this communication system, if a receiver as shown in FIGURE 3 is mounted on a vehicle traveling to the right in the lane 12, then the area adjacent the trigger transmitting loop 17 will be entered first. A magnetic field, as represented by the graph 21, in excess of the triggering level line 24, will be received and will be effective to energize the trigger circuit 29. This will not immediately activate the relay 34, but will trigger the delay multivibrator 30 which will produce an output pulse of a fraction of a second in duration. At the termination or trailing edge of the pulse, the multivibrator 33 will be triggered. This will energize the relay 34 and close the contacts 35 so that the message signal will be applied to the speaker 36. The delay introduced by the delay multivibrator 30 is effective to allow the vehicle to pass the region of the high-level trigger signal. The pulse produced by the multivibrator 33 will be 10 to 20 seconds in duration, maintaining the contacts 35 closed until the vehicle has passed through the region of the message signal transmission so that the entire message may be received.

Vehicles traveling in the opposite direction or to the left in lane 11 will not receive the message. The magnetic field in the region adjacent the loop 16, which the vehicle enters first, will not exceed the line 24 as shown in FIGURE 2. Thus, the trigger circuit 29 will not be energized by the low-level message signal. Subsequently, however, the vehicle will enter the region adjacent the loop 17 and the trigger circuit 29 will be energized by the high-level message signal or trigger signal. After a delay produced by the delay multivibrator 30, the multivibrator 33 will be triggered and the contacts 35 closed. However, by this time the vehicle will no longer be in the area wherein the message signal can be received. Thus, even though the speaker 36 will receive the detected output, there will be no message signal to be reproduced.

While there has been illustrated a particular embodiment of the invention, it will of course be understood that the invention is not limited thereto. Persons skilled in the art may make various modifications in the antenna array, the receiver configuration, or the frequency range used for transmission. Thus, it is contemplated that the appended claims will cover any modifications as fall within the true scope of the invention as defined thereby.

I claim:

1. In a system for transmitting information to a moving vehicle, a transmitter adapted to generate a message signal containing the desired information, a first transmitting loop connected to the transmitter and positioned adjacent a first portion of the path of said vehicle to produce a magnetic field of a first magnitude along said first portion, a second transmitting loop connected to the transmitter and positioned adjacent a second portion of said path immediately adjacent said first portion to produce a magnetic field of a second magnitude along said second portion, said first magnitude being much greater than said second magnitude, and vehicle-mounted receiving means including a receiving antenna and a normally inactive message signal reproducing means, and trigger means connected between the receiving antenna and the reproducing means for activating the reproducing means in response to a message signal having an amplitude greater than that produced by the magnetic field of the second magnitude.

2. In a system for transmitting information to a moving vehicle only when it is moving in a given direction along a roadway, a transmitter adapted to generate a carrier wave modulated in accordance with a message signal containing the desired information, a first transmitting antenna connected to the transmitter and positioned adjacent a first portion of the roadway, a second transmitting antenna connected to the transmitter and positioned adjacent a second portion of the roadway, the second antenna having a field pattern of given field intensity extending along the roadway a distance corresponding to that traversed by the vehicle during the message signal, the first antenna having a field pattern of substantially greater field intensity and extending along the roadway a substantially shorter distance than that of the second antenna, and vehicle mounted receiving means including a receiving antenna and message signal reproducing means, trigger means connected between the receiving antenna and reproducing means for activating the reproducer means in response to a message signal having an amplitude greater than that produced by said given field intensity of the second antenna.

3. In a system for transmitting information to a moving vehicle, a transmitter adapted to generate a message signal containing the desired information, a first transmitting loop connected to the transmitter and positioned adjacent a first portion of the path of said vehicle to produce a magnetic field of a first magnitude along said first portion, a second transmitting loop connected to the transmitter and positioned adjacent a second portion of said path immediately adjacent said first portion to produce a magnetic field of a second magnitude along said second portion, said first magnitude being much greater than said second magnitude, vehicle-mounted receiving means comprising a receiving antenna, amplifying means connected with the antenna for producing an output signal when a message signal within a predetermined frequency band is received, a trigger circuit connected to the amplifying means to produce an electrical signal when said output signal has an amplitude greater than that produced by the magnetic field of the second magnitude, normally inactive message reproducing means connected to the amplifying means and activating means connected between the trigger means and the reproducing means and responsive to said electrical signal for activating said reproducing means.

4. The system as defined in claim 3 wherein said activating means comprises an electrical signal generator for producing said electrical signal, first time delay means connected between the trigger circuit and the signal generator for delaying the development of said electrical signal for a predetermined time, said signal generator including second time delay means for maintaining the electrical signal for a predetermined period of time.

References Cited in the file of this patent

UNITED STATES PATENTS

| | | |
|---|---|---|
| 1,219,508 | Von Kramer | Mar. 20, 1917 |
| 2,398,741 | Halstead | Apr. 16, 1946 |
| 2,407,417 | Halstead | Sept. 10, 1946 |
| 2,429,607 | Capen | Oct. 28, 1947 |
| 2,493,755 | Ferrill | Jan. 10, 1950 |
| 2,600,405 | Hoeppner | June 17, 1952 |
| 2,966,659 | Dahlbom et al. | Dec. 27, 1960 |
| 2,980,794 | Hargreaves et al. | Apr. 18, 1961 |